United States Patent
Broomhall et al.

(10) Patent No.: US 6,292,904 B1
(45) Date of Patent: Sep. 18, 2001

(54) CLIENT ACCOUNT GENERATION AND AUTHENTICATION SYSTEM FOR A NETWORK SERVER

(75) Inventors: Matthew Broomhall, South Burlington; Lauri Jackson Landau, Shelburne, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,029

(22) Filed: Dec. 16, 1998

(51) Int. Cl.[7] ..................................................... H02H 3/05
(52) U.S. Cl. ............................. 714/1; 709/217; 709/223; 709/225; 713/200; 713/201; 713/202; 714/6
(58) Field of Search ................................... 709/223, 217, 709/225; 713/201, 202, 200; 714/1, 6

(56) References Cited

U.S. PATENT DOCUMENTS

| | | | |
|---|---|---|---|
| 5,675,782 | 10/1997 | Montague et al. | 713/201 |
| 5,805,803 | 9/1998 | Birrell et al. | 713/201 |
| 5,822,518 | 10/1998 | Ooki et al. | 713/201 |
| 6,161,185 | * 12/2000 | Guthrie et al. | 713/201 |
| 6,170,017 | * 1/2001 | Dias et al. | 709/235 |
| 6,175,831 | * 1/2001 | Weinreich et al. | 707/10 |
| 6,216,162 | * 4/2001 | Dutcher et al. | 709/226 |

FOREIGN PATENT DOCUMENTS

WO98/07088  2/1998 (WO) ................................ G06F/9/46

* cited by examiner

Primary Examiner—Thomas Lee
Assistant Examiner—Tammara Peyton
(74) Attorney, Agent, or Firm—Jay H. Anderson

(57) ABSTRACT

A system and method are described for providing secure user account identifiers and passwords to facilitate sharing by users of data between a secure internal server and an external server accessible over the Internet. A user account identifier is generated in accordance with a request from a user having access to the internal server, and a password associated with the account identifier is assigned. The account identifier and password are stored in a database on the internal server. A user account identifier database for an external user is replicated to the external server. The external user may obtain access to data replicated from the internal server to the external server. To provide a unique account identifier for each user, the account identifiers have different formats. When the user account identifier is for the requestor's own use, the user account identifier has a format determined by a type of user account (such as Lotus Notes) already owned by the requester. When the user account identifier is requested for an external user, the user account identifier has a format determined by the external user's Internet identifier.

19 Claims, 11 Drawing Sheets

DIRECTORY DATABASE

| FIRST NAME 801 | LAST NAME 802 | EMPLOYEE ID # 803 | COUNTRY CODE 804 | NOTES NAME 805 | SHORT NAME 806 | INTERNET ADDRESS 807 |
|---|---|---|---|---|---|---|
| MATTHEW | BROOMHALL | 386010 | 01 | MATTHEW E. BROOMHALL/ BURLINGTON/IBM | MATTB | MATTB@ IBMUS.COM |
| JAY | ANDERSON | 087746 | 01 | JAY H. ANDERSON/ FISHKILL/IBM | JAYANDER | JAYANDER@ IBMUS.COM |
| JANE | SMITH | 416837 | 01 | | | |

| DIVISION 808 | DEPT 809 | WORK LOCATION 810 | VM USER ID 811 | VM NODE 812 |
|---|---|---|---|---|
| 18 | 76A | BTV | MATTB | IBMUSM05 |
| 29 | 076 | EFK | JAYANDER | IBMUSM01 |
| 29 | 07Y | EFK | SMITJANE | IBMUSM01 |

INTERNAL USER DATABASE web1.nsf — 205

| FIRST NAME 801 | LAST NAME 802 | EMPLOYEE ID # 803 | COUNTRY CODE 804 | NOTES NAME 805 | SHORT NAME 806 | INTERNET ADDRESS 807 | USER ACCOUNT NAME 901 | PASSWORD 902 |
|---|---|---|---|---|---|---|---|---|
| MATTHEW | BROOMHILL | 386010 | 01 | MATTHEW E. BROOMHALL/ BURLINGTON/IBM | MATTB | MATTB@ IBMUS.COM | MATTHEW E. BROOMHALL/ BURLINGTON/IBM | **** |
| JAY | ANDERSON | 087746 | 01 | JAY H. ANDERSON/ FISHKILL/IBM | JAYANDER | JAYANDER@ IBMUS.COM | JAY H. ANDERSON/ FISHKILL/IBM | *** |

FIG. 10

INTERNAL (NON-NOTES) USER DATABASE web2.nsf — 206

| FIRST NAME 801 | LAST NAME 802 | EMPLOYEE ID # 803 | COUNTRY CODE 804 | DIVISION 808 | DEPT 809 | WORK LOCATION 810 | VM USER ID 811 | VM NODE 812 | USER ACCOUNT NAME 1001 | PASSWORD 1002 |
|---|---|---|---|---|---|---|---|---|---|---|
| JANE | SMITH | 416837 | 01 | 29 | 07Y | EFK | SMITJANE | IBMUSM01 | SMITJANE/ IBMUSM01 | ***** |

EXTERNAL USER DATABASE web3.nsf — 207

| 1101 | 1102 | 1103 | 1104 | 1105 | 1106 | 1107 | 1108 | 1109 | 1110 |
|---|---|---|---|---|---|---|---|---|---|
| FIRST NAME | LAST NAME | COMPANY | INTERNET ADDRESS | USER ACCOUNT NAME | PASSWORD | SPONSOR FIRST NAME | SPONSOR LAST NAME | SPONSOR ID # | COUNTRY CODE |
| JOE | ENGINEER | XYZ | JOEE@XYZINC.COM | JOEE/XYZINC/COM | ***** | MATTHEW | BROOMHALL | 386010 | 01 |

| 1111 | 1112 | 1113 | 1114 | 1115 | 1116 | 1117 |
|---|---|---|---|---|---|---|
| DIVISION | WORK LOCATION | MANAGER NAME | MANAGER ID # | COUNTRY CODE | SPONSOR EXTERNAL PHONE # | SPONSOR NOTES ADDRESS |
| 18 | BTV | LANDAU | 093423 | 01 | 802-555-5398 | MATTHEW E. BROOMHALL/ BURLINGTON/IBM |

| 1118 | 1119 |
|---|---|
| SPONSOR INTERNET ADDRESS | MANAGER NOTES ADDRESS |
| MATTB@ IBMUS.COM | L.P.LANDAU/ BURLINGTON/IBM |

FIG. 11

CLIENT ACCOUNT GENERATION AND AUTHENTICATION SYSTEM FOR A NETWORK SERVER

BACKGROUND OF THE INVENTION

This invention relates to a system for ensuring secure access to a network. More specifically, this invention relates to a password generation and management system running as an application on a network server, and which permits access to a secured database by remote users (including users communicating with the server over the Internet).

It is often desirable for a corporation to make its internal databases available to external users (for example, subscribers on the World Wide Web or "Extranet" as opposed to the corporation's "Intranet"). In particular, two business partners (each with its own "Intranet")may wish to share sensitive information. In these situations, providing secure access to databases (and maintaining the integrity of the content of those databases) is of great concern.

FIG. 1 shows schematically a networking arrangement with users belonging to different organizations. A corporate intranet 110 has a number of servers 130-1 to 130-n connected thereto, along with a number of users 120-1, 120-2, . . . , 120-n. Various applications running on servers 130 provide security for the intranet and its users. These applications, familiar to those skilled in the art, are collectively termed a "firewall," shown schematically as a wall 140 surrounding the organization. The users 120 may also connect to the Internet 100, to which a number of other servers 101-1 to 101-n are also connected.

Another user 105, though not part of the same organization as users 120, may still communicate with users 120 by connecting to the Internet 100. Users 120 may of course communicate with each other over the intranet 110. In both of these cases, access to databases on servers 130 must be controlled, and the security of the data must be assured. In particular, when user 120-1 (for example) establishes a link 141 extending past the firewall 140 to the Internet 100 and to user 105 (for example, a customer or business partner), it is necessary to ensure that no unauthorized access to the data residing on servers 130 occurs.

Accordingly, there is a need for a system that provides secure account management and content protection in a networking environment where both internal and external users have access to an organization's internal databases.

SUMMARY OF THE INVENTION

In accordance with the present invention, a method is described for providing secure user account identifiers and passwords to facilitate sharing by users of data between a secure internal server and an external server accessible over the Internet. A request for a user account identifier and password is received from a requestor; the request includes a requester identifier. Information regarding the requestor is retrieved from a directory on the internal server. A user account identifier is then generated in accordance with the request, and a user account password associated with the user account identifier is assigned. The user account identifier and user account password are communicated to the requester, and the user account identifier and user account password are stored in a user account identifier database on the internal server . A user account identifier database for an external user (that is, a user who communicates with the external server and does not appear in the directory) is replicated to the external server. Accordingly, the external user may obtain access to data replicated from the internal server to the external server.

The user account identifiers have different formats. When the user account identifier is for the requestor's own use, the user account identifier has a format determined by a type of user account (such as Lotus Notes) already owned by the requestor. However, when the user account identifier is requested for an external user, the user account identifier has a format determined by the external user's Internet identifier. This arrangement provides a unique user account identifier for each user.

According to another aspect of the invention, a system is provided for generating user account identifiers and passwords using the method described just above.

According to a further aspect of the invention, a computer-readable medium is provided, having stored therein instructions for performing the above-described method for generating user account identifiers and passwords.

BRIEF DESCRIPTION OF THE DRAWINGS

FIG. 8 shows in tabular form the structure of a directory database used by the system of the present invention.

FIG. 9 shows in tabular form the structure of an internal user database, where the account names generated by the system of the present invention are based on the users' Lotus Notes account names.

FIG. 10 shows in tabular form the structure of an internal user database, where the account names generated by the system of the present invention are based on the users' VM account names.

FIG. 11 shows in tabular form the structure of an external user database, where the account names generated by the system of the present invention are based on the users' Internet addresses.

DETAILED DESCRIPTION OF THE PREFERRED EMBODIMENTS

The invention will be described with reference to Lotus Notes and Lotus Domino (products of Lotus Development Corp., a subsidiary of International Business Machines Corp.). Lotus Domino may be used with Lotus Notes to publish interactively Lotus Notes application databases to the World Wide Web (that is, make such databases available to anyone with access to the Web).

In its preferred embodiment, the system of the present invention processes incoming requests for intranet or Internet user IDs and passwords, and subsequently generates user account names and passwords.

Figure 1:
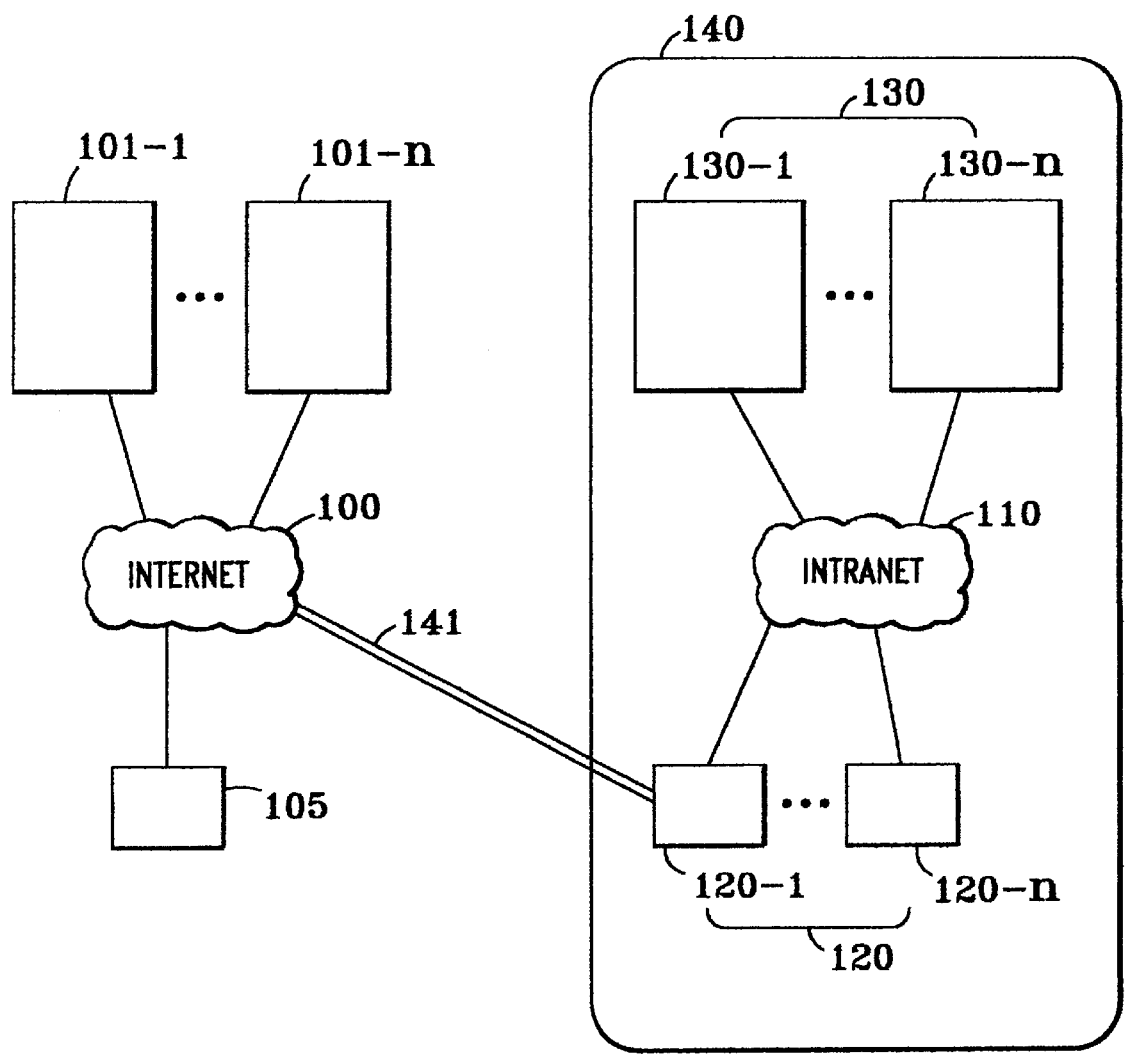
FIG. 1 is a schematic view of a typical networking arrangement w users belonging to different organizations.
Figure 2:
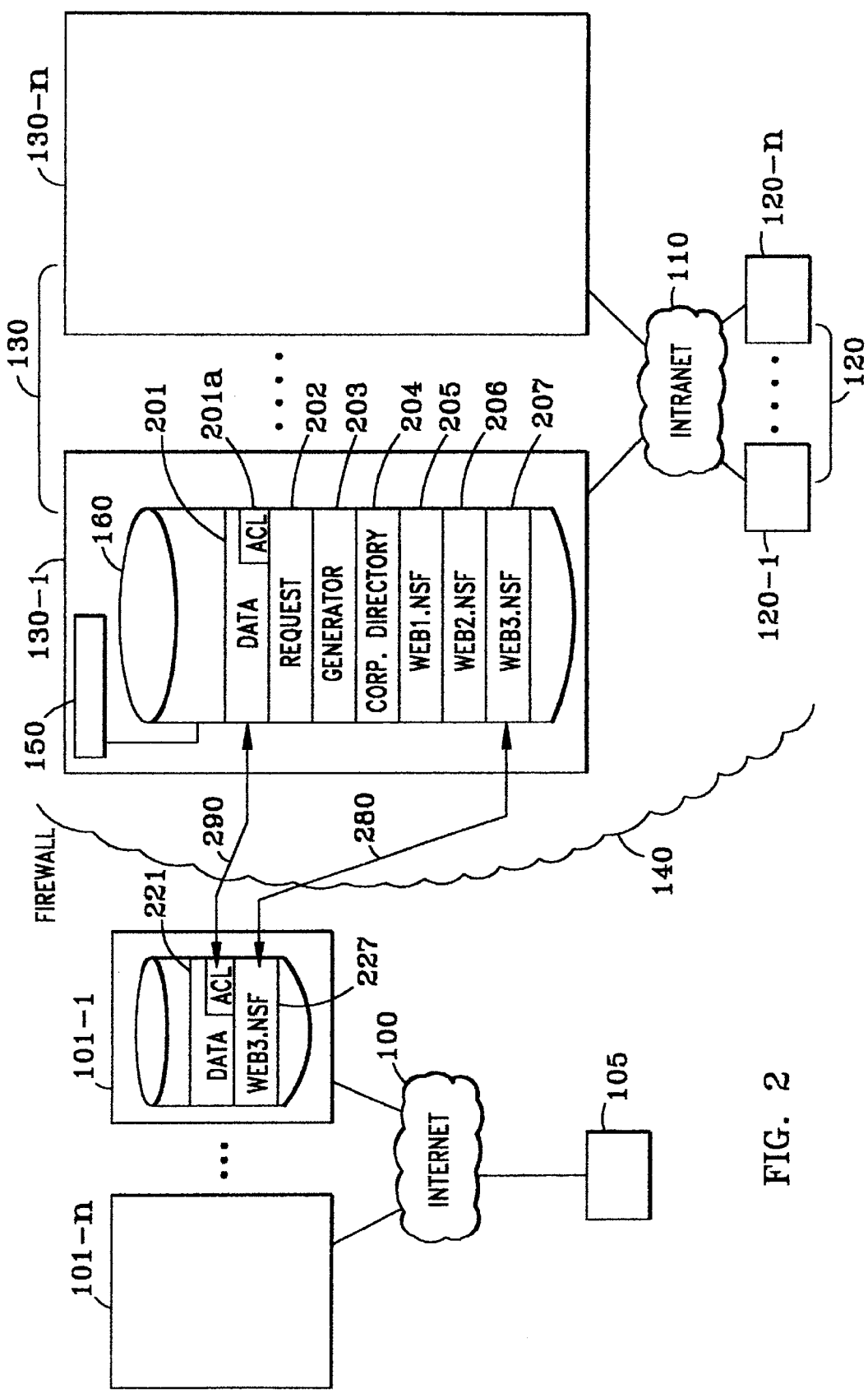
FIG. 2 is an overall schematic diagram of the system of the present invention.

FIG. 2 is a schematic representation of the system architecture. Inside the firewall 140, an organization maintains one or more servers 130-1, . . . , 130-n. A server (for example, 130-1) includes a processing unit 150, connected to a storage device 160 having several databases 201–207 stored therein. These databases include a database 201 whose content the organization wishes to share with others while maintaining security. A request database 202 contains information inputted by a user when requesting creation of an account. A generator database 203 contains instructions for generating the Internet addresses and passwords. (Databases 202 and 203 together comprise the administrative engine of the system, the details of which are described below.) Database 204 contains the organization's personnel directory (for example, the directory on the Lotus Notes system), which is used to verify the information submitted with a request.

Databases 205–207 contain the user IDs and passwords for the system users 120-1, . . . , 120-n and 105. These three databases correspond to three different types of users. In particular, database 205 contains information regarding internal users who have an existing Lotus Notes account, while database 206 contains information regarding internal users without Lotus Notes accounts. Database 207 contains information regarding external users, whose accounts are created at the request of internal sponsors. It is preferable that these three databases be maintained separately from each other, as described in more detail below.

Figure 3:
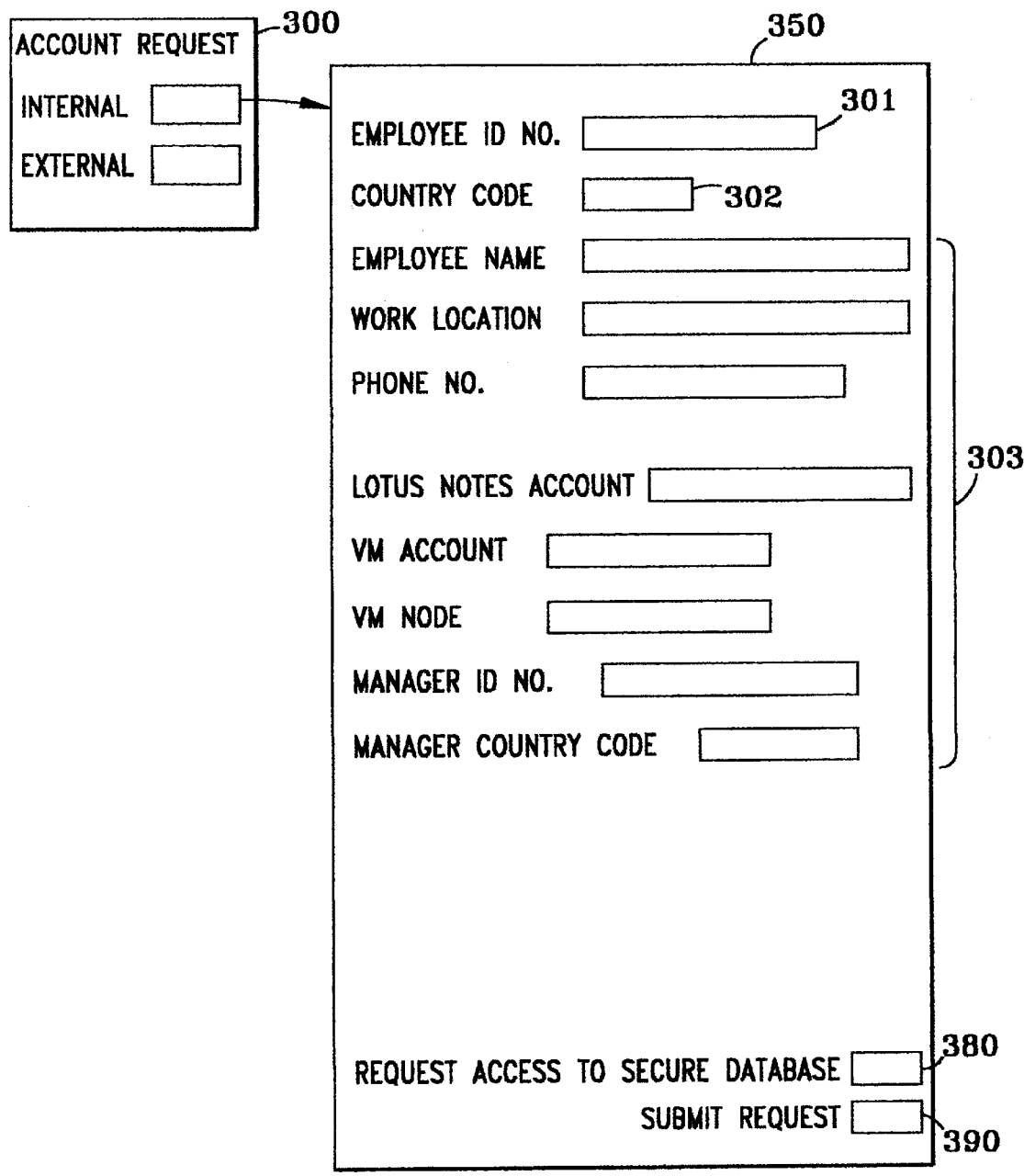
FIG. 3 illustrates a request form for an internal user account.

The administrative engine (the "front end" accessible by the requester) is a Web application, accessible via a Web browser. The front end of the system includes a server web home page with a launch point to the registration page. The registration page is the launch point for forms that allow a user to do various tasks; for example, Request a Domino web account Request a password change Request access to a secured database Report problems As shown schematically in FIG. 3, the Domino account request form 300 presents the requester with two options: (1) request an internal Domino account, or (2) request an account for an external user. Launching a form 350 to request an internal Domino account provides one input field 301 for the user to supply his personal ID number (such as an employee or contractor ID number issued to him by the corporation), and a dialog box 302 to select the appropriate country code. Additional fields 303 are provided for the requestor to input his name, work location and telephone number; his Lotus Notes account ID (or other system ID, for example his VM account ID); and his manager's ID number and country code. This information is temporarily stored in the request database 202.

Figure 4:
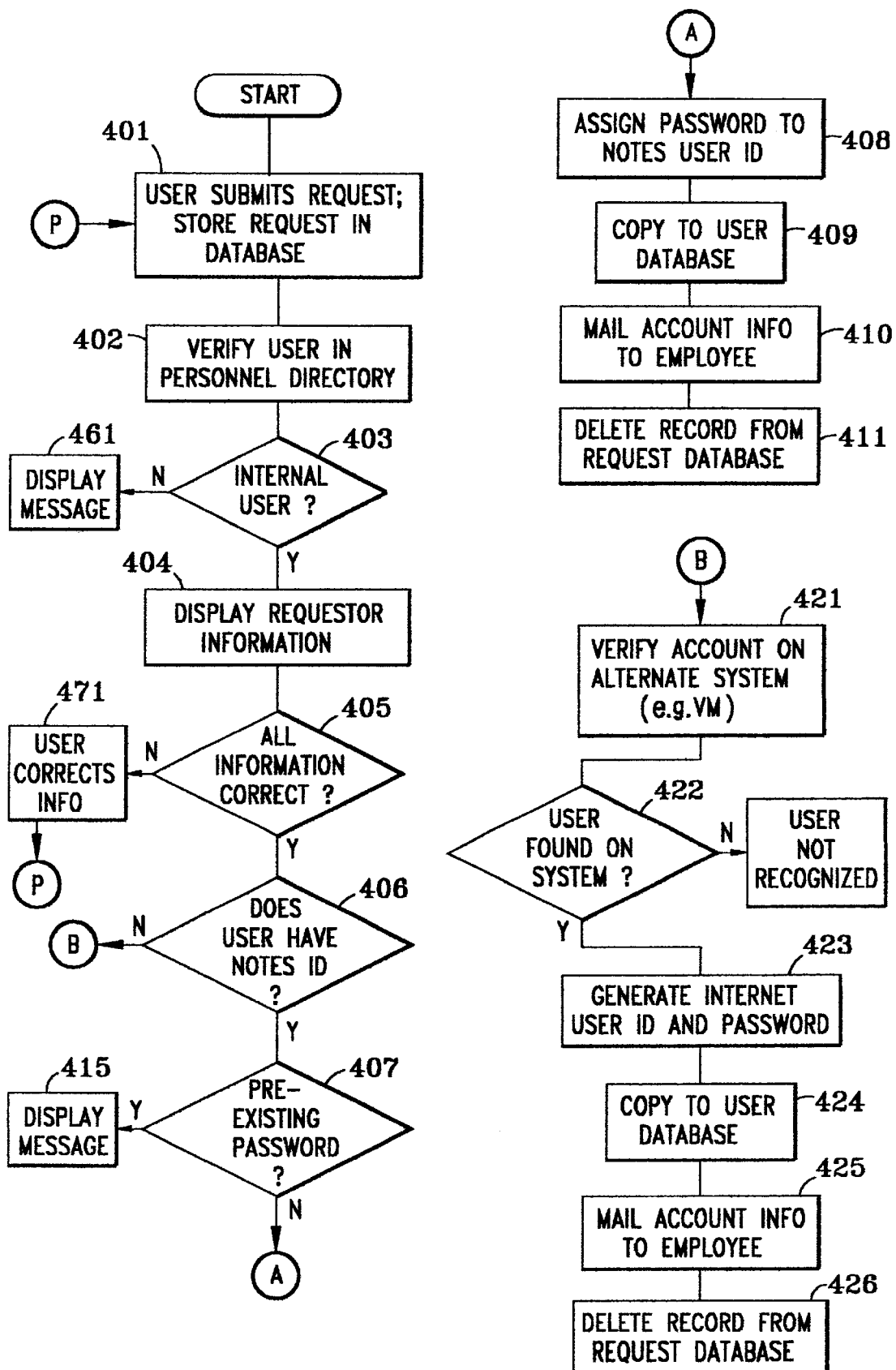
FIG. 4 is a flowchart showing steps in a process for generating user account names and passwords for internal users of the networking system of the present invention.

Steps in the account generation procedure (wherein processor 150 executes instructions stored in the generator database 203) for an internal user are shown in FIG. 4. Pressing the "submit" button 390 on the request form 350 (step 401) generates a search (step 402) of the corporate directory 204 for a match with parameters inputted by the requester. For example, the system may search database 204 for an employee ID number and country code matching those in fields 301 and 302. If a match is found (step 403), the data for the employee is displayed in a table (step 404). The display may include the following information:

Employee name

Department

Division

Work location

Lotus Notes account (if user has an existing account)

Internet address

Other system (e.g. VM) user ID

VM node

Manager's name

If any of the displayed information is not correct (step 405), the user may re-enter that information (step 471). Otherwise, the system will proceed to open a new account, or indicate the existence of a previously created account.

If a match is not found in the corporate directory 204, a message indicating same is displayed, with an additional message to return and re-enter the user data (step 461). If problems persist, additional avenues for resolution are also provided (for example, displaying a system administrator's e-mail address or telephone number). This level of checking insures that users can only generate accounts for legitimate employees or contractors.

If the user already has a Lotus Notes account or ID (step 406), the system checks for a pre-existing password (step 407). If a password already exists, a message indicating this is presented to the user (step 415). Otherwise, the user is assigned a Domino Web account and password based on the Lotus Notes account name (step 408). For example, the Domino account name generated on the basis of an existing Notes ID may be in the following form:

Matthew E. Broomhall/Burlington/IBM with a password then generated and applied to this account. The new account ID and password are then copied to the user database 205 (step 409). To protect the user community, the account information is mailed to the employee listed in the directory whose information matched the inputted ID number (step 410). This feature prevents a person from fraudulently generating and using an account under another employee's name, thereby enhancing the security of the system. Finally, the requestor's information is deleted from the request database 202 (step 411).

A user not having a Lotus Notes account/ID would be assigned a Domino Web user account based on his ID on another system (for example, his VM user ID and node), as obtained from the directory database 204 (steps 421, 422). The account name generated in this case (step 423) may have the following form:

mattb/ibmusm5

The new user ID and password are copied to the user database 206 (step 424), and the account information is mailed to the employee listed in the directory whose information matched the inputted ID number (step 425). As with an account generated for an existing Lotus Notes user, only the owner of the information in the directory 204 receives the account information, thereby protecting the user community from fraudulent account generation and use. The requestor's information is then deleted from the request database 202 (step 426).

Figure 5:
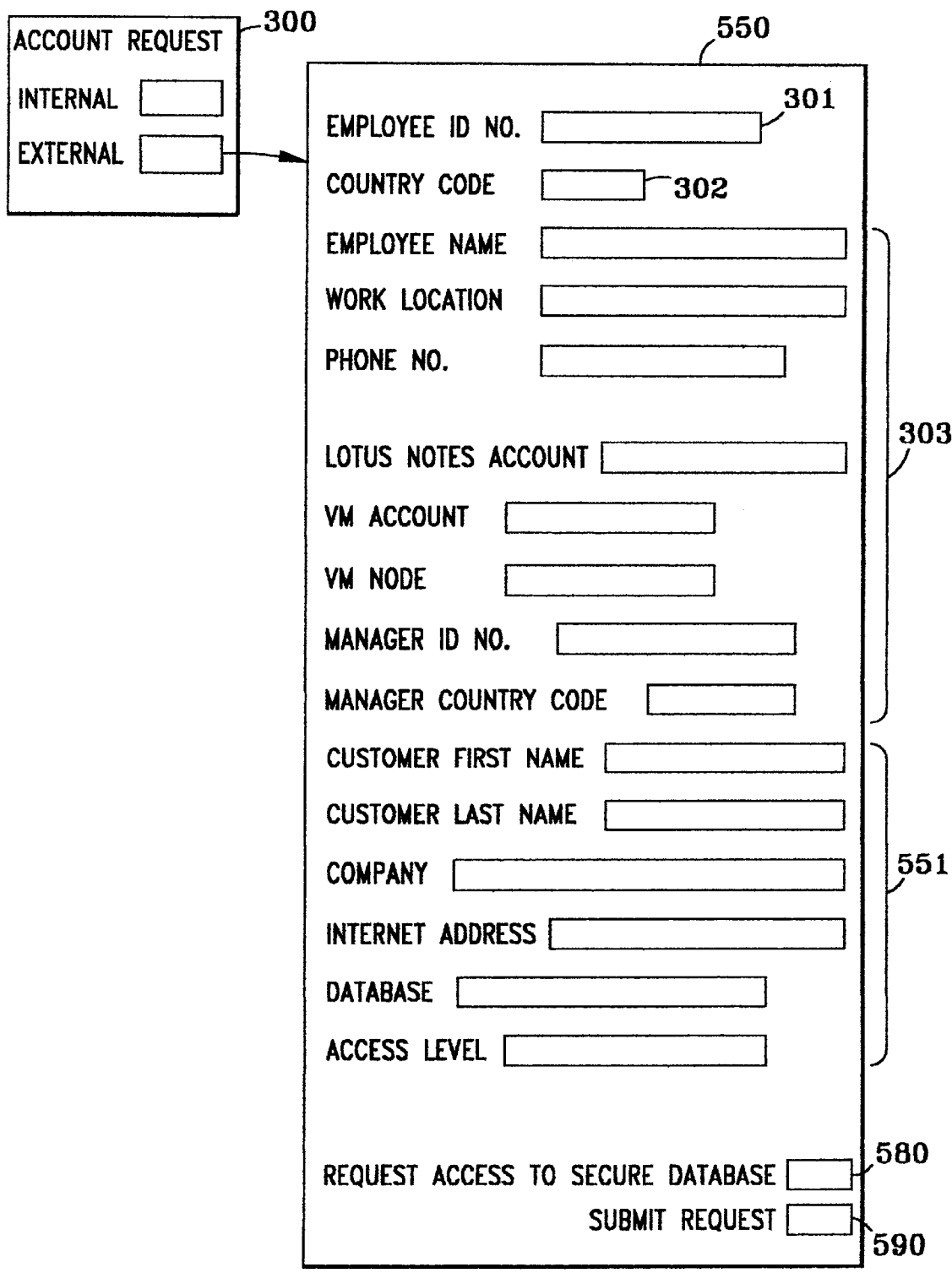
FIG. 5 illustrates a request form for an external user account.

If an internal sponsor requires information in a Domino database (for example, database 201 on server 120-1) to be securely shared with users (e.g. customers) outside the corporate intranet, a Domino Web account can be generated for that external user. The internal sponsor must be an employee of the corporation. As shown in FIG. 5, the form 550 for generating this account requires additional information besides the requestor's ID number and country code. The additional information, to be entered in fields 551, is:

Customer first name
Customer last name
Company
Customer Internet address
Database to be accessed
Access level The highest access level offered to an external user may be different from that available to internal users (for example, "Editor" as opposed to "System Administrator").

Figure 6:
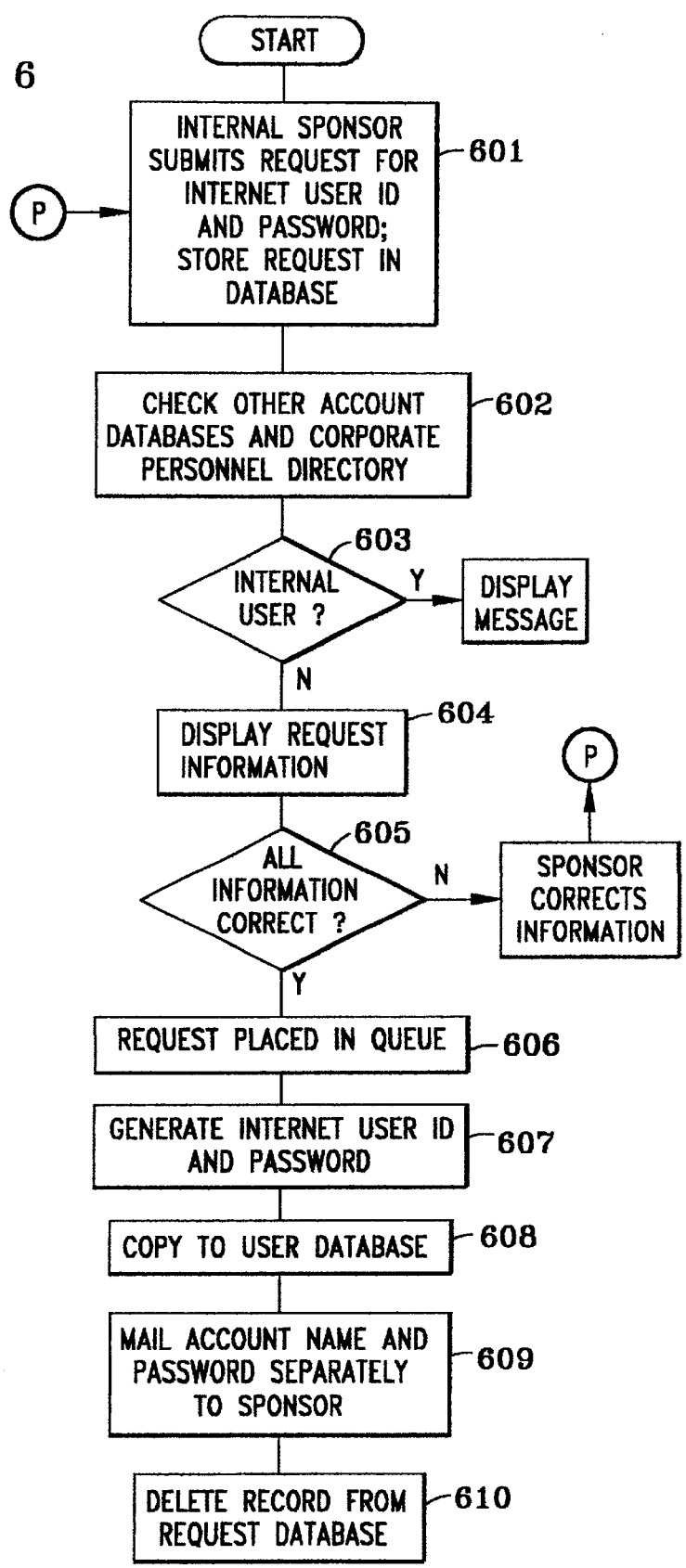
FIG. 6 is a flowchart showing steps in a process for generating user account names and passwords for an external user of the networking system of the present invention.

The account generation procedure for an external user is shown schematically in FIG. 6. The requester (in this case, the internal sponsor) presses the "submit" button 590 on the request form 550 (step 601). The system checks the directory database 204 and the internal user databases 205 and 206 to verify that the user for whom the account is being created is not an internal user (steps 602, 603). In step 604 the system generates a page with the requestor's information, just as with all other requests, once again offering the option to re-enter data or continue. If "continue" is selected (step 605), the system then queues the request (step 606).

The Domino Web account is then generated (step 607) on the basis of the external user's Internet mail address. A record is then added to the external user database 207, including the internal sponsor information and the external user's ID and password (step 608). It should be noted that in this instance, the Domino Web account and password when taken together are security-sensitive information. Accordingly, the Domino Web account name and password are each sent separately, via Notes mail, to the internal sponsor only (step 609). In this case, the account name has the following form:

mattb/us/ibm/com

It should be noted that the names of accounts have different formats, and are stored in different databases 205, 206, 207, depending on whether they are associated with (1) an employee having an existing Notes ID, (2) an employee without an existing Notes ID, or (3) an external user. This is done to guarantee the uniqueness of the Domino Web account name. Finally, the requestor's information is deleted from the request database 202 (step 610).

Figure 7:
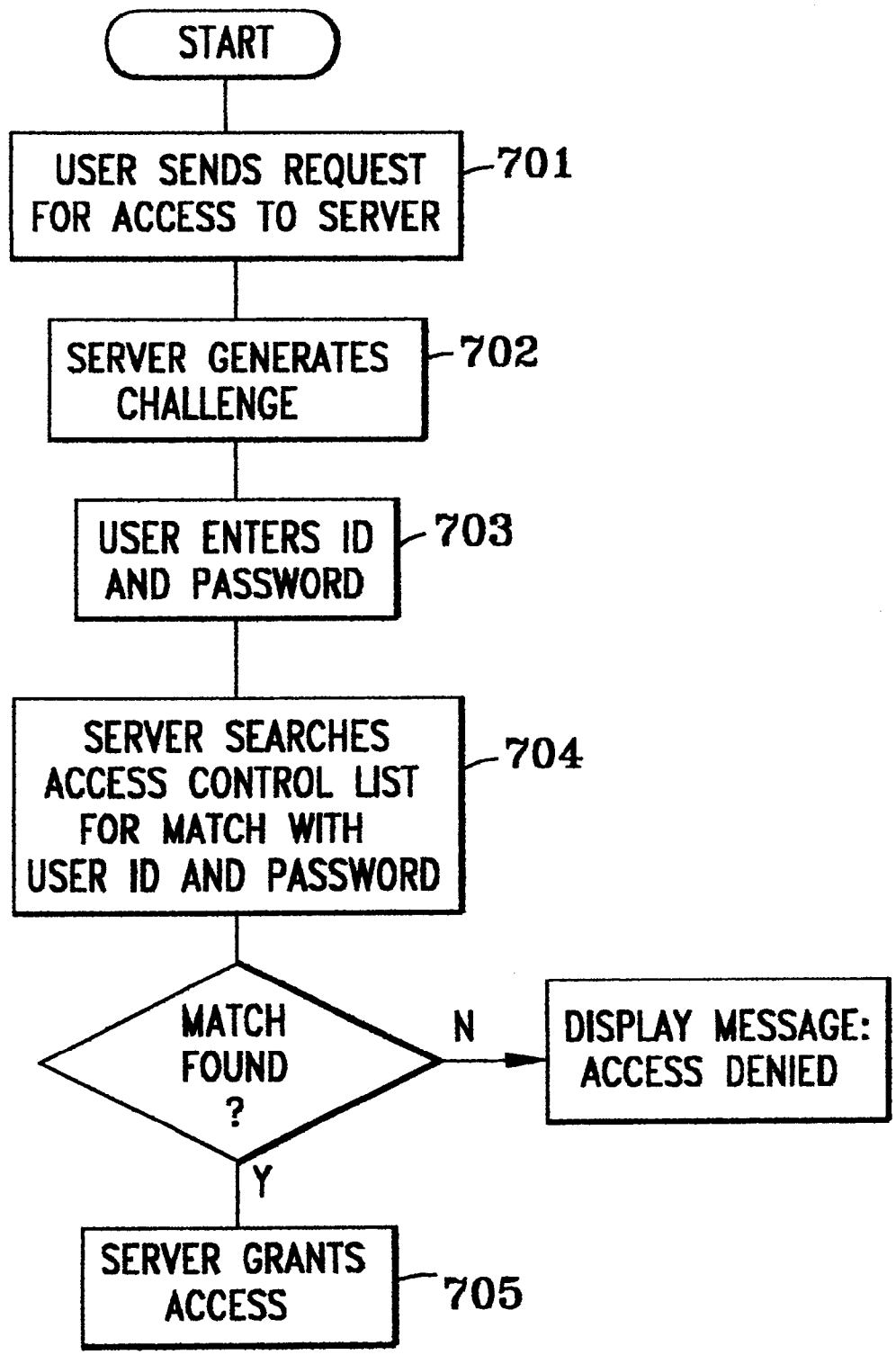
FIG. 7 is a flowchart illustrating the use of an access control list to control access to a secure database.

In general, it is necessary to control access to a database residing on a Domino server (such as database 201 on server 130-1). This is done by using an access control list 201a specific to each database; the access control list includes the user IDs and passwords of those users (either or external users) to be granted access. The use of an access control list is shown in FIG. 7. When a user requests access to a particular database (step 701), the server generates a "challenge," that is, a prompt for the user's ID and password (step 702). The user then enters his ID and password (step 703). The system searches the access control list (step 704) and grants access (step 705) only if a match is found therein. It will be appreciated that it is essential to have a unique user identifier to compare with access control lists for the databases residing on the Domino servers.

To further ensure the security of the password, the process by which it is generated is automated, so that the password in its originally created form is not visible to any system administration personnel. All requests for accounts, once they are successfully queued, are held in a custom staging area database separate from the registration request database 202. An automated process then generates appropriate account names and passwords in response to the queued requests on a scheduled basis (for example, every 15 minutes). The same process generates the message to the owner of the record in the corporate directory database 204 corresponding to which the account was opened. Alternatively, in the case of an external request, the automated process sends the message in two parts to the internal sponsor. In either case, the newly generated password is maintained in a field of the user ID/password database (205, 206 or 207) in a hashed form; that is, the coded value of the hashed password is equivalent to that of the actual password, but the password itself is not readable by any end user or administrator. This means that if a user forgets his password, it is necessary to generate a new password; the forgotten password cannot be retrieved in human-readable form.

All Domino web user accounts are stored in custom databases 205–207, according to account type; the Domino web server 130-1 can access and use these databases to authenticate users and map access controls properly to the databases on the Domino web server. Storing the user accounts in separate databases, instead of storing them in the server's public name and address book, insures that no user will at any time be able to read the information contained in any person or account that is used to provide access to the server or to individual databases. These separate databases 205–207 are not publicly readable, and are cascaded off the server's name and address book so that only the server can access and use the information contained therein. Since the server's public name and address book does not contain this added volume of information, this arrangement also protects the server's public name and address book from performance degradation.

The three databases 205–207 that hold the Domino web account information may be named as follows:

web1.nsf Lotus Notes users
web2.nsf VM based user account
web3.nsf External Internet name based user accounts The first of these databases 205, web1.nsf, is a selective replica of the corporation's public name and address book. This by default contains all current and valid Lotus Notes users in the population. The Domino web account generation process verifies the existence of the user in this database before generating an account. If the user is found in this database, the process checks for a pre-existing password. If a password already exists, a message indicating this is presented to the user; otherwise, a password is generated and mailed.

The second database 206, web2.nsf, contains all accounts generated using the VM user ID and node information. The third database 207, web3.nsf, contains information regarding all accounts generated for external users. The accounts in web3.nsf are first generated internally; this database is then replicated to the external Domino web server 101-1. The replicated database 227 is then used by the Domino web server for user authentication and access control to other databases. No replication of database 227 back to the internal server is performed. It should be noted that with this arrangement, deliberate corruption ("hacking")of the replicated web3.nsf database on the external server 101-1 is not propagated to the internal server 130-1. Furthermore, any corruption of the database is overwritten by a subsequent replication. This one-way outbound replication is illustrated schematically by the single-headed arrow 280 in FIG. 2.

End user databases on the external servers 101 may be grouped into two categories: (1) anonymous access and (2) restricted access. An anonymous access database is one which any web client is permitted to read (for example, a database containing product sales and marketing information). Access to a restricted access database requires that the user have an account; this type of database is used to collect and distribute sensitive information to a select group of individuals. From the registration request page 350 or 550, the user may press a button 380 or 580 labeled "Request Access to a Secured Database." The system then presents the user with an additional form allowing the user to view the anonymous access databases, or to select a secured database to which access is desired. If the user selects a secured database, an automated request is sent to the database owner. The database owner (for example, a system administrator in the organization responsible for the database) will either grant or reject the request, with a reply automatically mailed back to the administrative engine.

The structure of databases 204–207 is shown schematically in FIGS. 8–11 respectively. FIG. 8 shows the various fields of the corporate directory database 204. This database includes fields containing the employee first name 801, last name 802, employee ID number 803 and country code 804. Additional fields are provided for the employee's Lotus Notes name 805 and short name 806, and Internet address 807; these fields are populated if the employee has such addresses. Other fields contain the employee's division 808, department 809, and work location 810. Fields are also provided for the employee's address on an alternate system (for example, a VM user ID 811 and VM node 812).

The fields of the internal user database 205, here named web1.nsf, are shown in FIG. 9. The employee first name 801, last name 802, ID number 803, country code 804, Lotus Notes name 805 and short name 806, and Internet address 807 are replicated from the directory database 204. An additional field 901 contains the user account name, based on the Lotus Notes name. Another field 902 contains the password assigned to the user. As noted above, the password is displayed only in a hashed form (that is, not human-readable).

FIG. 10 shows the structure of the internal user database 206, named web2.nsf. The employee's first name 801, last name 802, ID number 803, country code 804, division 808, department 809, work location 810, VM user ID 811 and VM node 812 are replicated from the directory database 204. An additional field 1001 contains the user ID generated for the employee, who does not have a Lotus Notes account. (In this example, the user ID is based on the employee's VM user ID and VM node.) Another field 1002 contains the password assigned to the user; the password is displayed only in a hashed form.

FIG. 11 shows the fields of the external user database 207, named web3.nsf. Fields 1101–1106 pertain to the external user, while fields 1107–1119 pertain to the internal sponsor and his manager. The external user's first name 1101, last name 1102, company 1103 and Internet address 1104 are as input by the sponsor on the request form 550. The Lotus Domino user account name 1105 is based on the Internet address of the external user. Another field 1106 contains the password assigned to the external user; this password is displayed only in a hashed form. Fields 1107–1112, 1117 and 1118 contain the sponsor's first name, last name, employee ID number, country code, division, work location, Notes address and Internet address, respectively; this information is replicated from the directory database 204. The sponsor's external phone number 1116 is copied from the request form 550. The sponsor is also required to give his manager's ID number on the request form; this is used to replicate the manager's name 1113, ID number 1114, country code 1115 and Notes address 1119 from the directory database 204.

Figure 12:
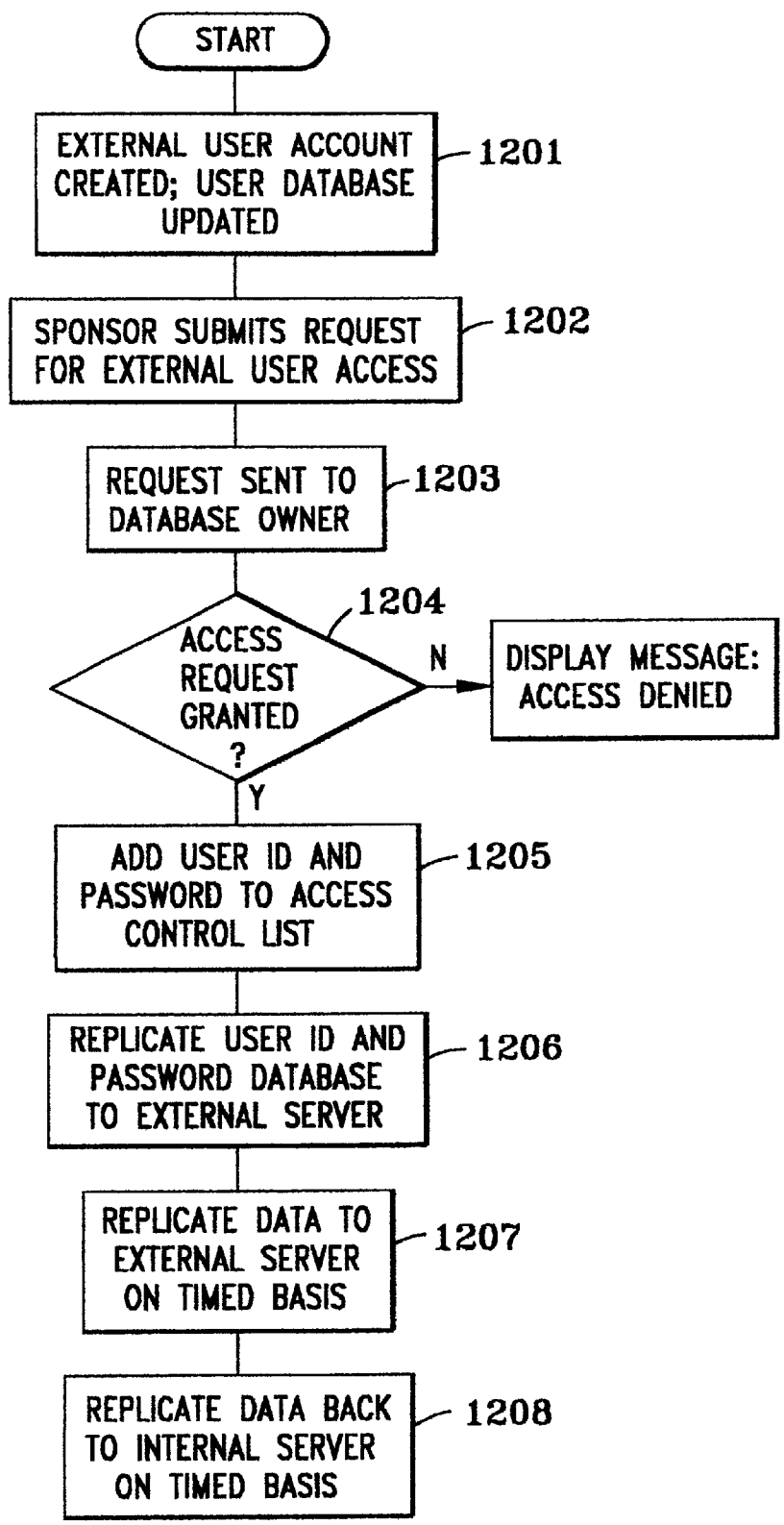
FIG. 12 is a flowchart showing steps in a process for making a secure database on an internal server accessible to an external user communicating with an external server over the Internet.

If an internal user 120-1 wishes to share data in a secure database 201 with an external user 105, the internal user (the sponsor) makes a request for a user ID and password on behalf of the external user, and also requests access to the secured database for the external user. This procedure is shown schematically in FIG. 12. In step 1201, an account for the external user is created and a record is added to the web3.nsf database 207 (see steps 607 and 608 in FIG. 6). The request for access inputted by the sponsor (step 1202) is sent to the database owner (step 1203). Once the request for access is granted (step 1204), the user ID and password are added to the access control list 201a (step 1205). The revised database 207 is replicated to the external server 101-1 (step 1206). The server uses this database 227 to recognize the external user 105. Furthermore, the secure database 201 (with the access control list) is replicated to the server 101-1. The external user 105 accesses the replicated database 221, following the procedure discussed above with reference to FIG. 7. If authorized to do so, the external user may modify the data in the database 221. Meanwhile, an internal user 120 may modify the data in database 201. To ensure that the same data is maintained in databases 201 and 221, a two-way replication is performed on a timed basis; that is, database 201 is periodically replicated to the external server, and database 221 is periodically replicated back to the internal server (steps 1207 and 1208). The two-way replication is illustrated schematically by double-headed arrow 290.

It will be appreciated that the security of the internal network is assured by the one-way replication 280 of the external user database, while sharing of data between internal and external users is facilitated by the two-way replication 290 of databases 201 and 221. In this regard, it should be noted that anonymous access databases may be replicated either in one-way fashion (if the database is intended only to be read by the user) or in two-way fashion (if the database may be modified by the user).

A password is reset in one of the following three instances: (1) when the password is known but has expired; (2) when the password is known and has not expired, but the user desires a different password; (3) when the user has forgotten his password. In the first two cases, the password change is staged (that is, prepared for processing by the generator database 203) as for new accounts and processed along with other account requests; the new password is subsequently mailed to the internal user or sponsor. In the third case, the user sends an authenticatable request (for example, by Lotus Notes mail or VM mail) to the administrative engine, requesting that his account be staged for a new password.

The system of the present invention allows organizations to more effectively use Lotus Domino applications on the corporate intranet, and do so in a secure manner. In accordance with the present invention, users throughout an organization may run Domino applications, whether or not they have a native Notes ID file.

The system of the present invention may also be used to generate accounts for secure access to Domino applications residing on Domino servers operated by the corporate organization but outside the corporate firewall. This is an advantage for groups dealing with external organizations (for example, sales and marketing groups), who wish to exchange sensitive information in a secure manner with business partners.

It is a further advantage of the present invention that mechanisms are provided for managing access to applications residing on both internal and external Domino servers (that is, servers inside and outside the firewall). The security of the data residing on the servers is thereby enhanced, and the respective repositories of information are kept isolated and protected.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method for providing secure user account identifiers and passwords to facilitate sharing by users of data between a secure internal server and an external server accessible over the Internet, the method comprising the steps of:

receiving a request for a user account identifier and password from a requester, the request including a requestor identifier;

retrieving information regarding the requestor from a directory on the internal server, in accordance with said requestor identifier;

generating a user account identifier in accordance with the request;

assigning a user account password associated with the user account identifier;

communicating the user account identifier and user account password to the requestor;

storing the user account identifier and user account password in a user account identifier database on the internal server; and replicating the user account identifier database to the external server when the database contains a user account identifier for an external user not in said directory and communicating with the external server, so that the external user may obtain access to data replicated from the internal server to the external server, wherein when the user account identifier is for the requestor's own use, the user account identifier has a format determined by a type of user account already owned by the requester, and when the user account identifier is requested for an external user, the user account identifier has a format determined by the external user's Internet identifier, thereby providing a unique user account identifier for each of said users.

2. A method according to claim 1, wherein the user account identifier database is separate from the directory.

3. A method according to claim 1, wherein a separate user account identifier database for each user account identifier format is stored on the internal server.

4. A method according to claim 1, wherein the user account password is assigned and stored by an automated process.

5. A method according to claim 4, wherein the user account password is stored so as to prevent retrieval thereof in a human-readable form.

6. A method according to claim 1, further comprising the step of performing a two-way replication of data between the internal server and the external server, where the data is accessed by both a user of the internal server and the external user.

7. A method according to claim 1, wherein the data has associated therewith a list of records each including a user account identifier and an associated user account password, and further comprising the steps of:

receiving a request for access to the data from a user;

receiving the user account identifier and user account password from the user; and granting access to the data only if a record in the list matches the user account identifier and user account password received from the user.

8. A system for providing secure user account identifiers and passwords to facilitate sharing by users of data between a secure internal server and an external server accessible over the Internet, the system comprising:

said internal server, including a processor;

a storage device having stored therein a directory, a user account identifier database and instructions for execution by the processor; and means for communicating with a requestor of a user account identifier and a user account password; and means for communicating with the external server, wherein said instructions define a process comprising the steps of receiving a request for the user account identifier and user account password from the requestor, the request including a requester identifier, retrieving information regarding the requester from the directory in accordance with said requestor identifier, generating a user account identifier in accordance with the request, assigning a user account password associated with the user account identifier, communicating the user account identifier and user account password to the requester, storing the user account identifier and user account password in the user account identifier database, and replicating the user account identifier database to the external server when the database contains a user account identifier for an external user not in said directory and communicating with the external server, so that the external user may obtain access to data replicated from the internal server to the external server, and when the user account identifier is for the requestor's own use, the user account identifier has a format determined by a type of user account already owned by the requester, and when the user account identifier is requested for an external user, the user account identifier has a format determined by the external user's Internet identifier, thereby providing a unique user account identifier for each of said users.

9. A system according to claim 8, wherein the user account identifier database is separate from the directory.

10. A system according to claim 8, wherein a separate user account identifier database for each user account identifier format is stored in the storage device of the internal server.

11. A system according to claim 8, wherein the user account password is stored so as to prevent retrieval thereof in a human-readable form.

12. A system according to claim 8, wherein the internal server replicates data to the external server and stores replicated data received from the external server, where the data is accessed by both a user of the internal server and the external user.

13. A system according to claim 8, wherein the data has associated therewith a list of records each including a user account identifier and an associated user account password, and said instructions further define a process comprising the steps of receiving a request for access to the data from a user, receiving the user account identifier and user account password from the user, and granting access to the data only if a record in the list matches the user account identifier and user account password received from the user.

14. A computer-readable medium having stored therein instructions for execution of a process for providing secure user account identifiers and passwords to facilitate sharing by users of data between a secure internal server and an external server accessible over the Internet, the process comprising the steps of:

receiving a request for a user account identifier and password from a requester, the request including a requestor identifier;

retrieving information regarding the requestor from a directory on the internal server, in accordance with said requester identifier;

generating a user account identifier in accordance with the request;

assigning a user account password associated with the user account identifier;

communicating the user account identifier and user account password to the requester;

storing the user account identifier and user account password in a user account identifier database on the internal server; and replicating the user account identifier database to the external server when the database contains a user account identifier for an external user not in said directory and communicating with the external server, so that the external user may obtain access to data replicated from the internal server to the external server, wherein when the user account identifier is for the requestor's own use, the user account identifier has a format determined by a type of user account already owned by the requestor, and when the user account identifier is requested for an external user, the user account identifier has a format determined by the external user's Internet identifier, thereby providing a unique user account identifier for each of said users.

15. A computer-readable medium according to claim 14, wherein the user account identifier database is separate from the directory.

16. A computer-readable medium according to claim 14, wherein a separate user account identifier database for each user account identifier format is stored on the internal server.

17. A computer-readable medium according to claim 14, wherein the user account password is stored so as to prevent retrieval thereof in a human-readable form.

18. A computer-readable medium according to claim 14, wherein said process further comprises the steps of:

replicating data from the internal server to the external server; and storing replicated data received from the external server, where the data is accessed by both a user of the internal server and the external user.

19. A computer-readable medium according to claim 14, wherein the data has associated therewith a list of records each including a user account identifier and an associated user account password, and said process further comprises the steps of:

receiving a request for access to the data from a user;

receiving the user account identifier and user account password from the user; and granting access to the data only if a record in the list matches the user account identifier and user account password received from the user.

* * * * *